United States Patent [19]

Nishimura

[11] 4,374,472
[45] Feb. 22, 1983

[54] VIBRATION SENSOR

[75] Inventor: Toshifumi Nishimura, Yokosuka, Japan

[73] Assignee: Nissan Motor Co., Ltd., Yokohama, Japan

[21] Appl. No.: 190,284

[22] Filed: Sep. 24, 1980

[30] Foreign Application Priority Data

| Sep. 29, 1979 | [JP] | Japan | 54-126056 |
| Sep. 29, 1979 | [JP] | Japan | 54-126057 |
| Dec. 7, 1979 | [JP] | Japan | 54-169360[U] |
| Dec. 27, 1979 | [JP] | Japan | 54-171624 |
| Dec. 27, 1979 | [JP] | Japan | 54-185091[U] |
| Feb. 29, 1980 | [JP] | Japan | 55-25988[U] |

[51] Int. Cl.³ ............................................ G01L 23/22
[52] U.S. Cl. ..................................................... 73/35
[58] Field of Search ................. 73/35, 660; 123/406; 310/322

[56] References Cited

U.S. PATENT DOCUMENTS

| 2,384,465 | 9/1945 | Harrison | 310/322 |
| 3,675,053 | 7/1972 | Mifune et al. | |
| 4,254,354 | 3/1981 | Keem | 73/35 |

FOREIGN PATENT DOCUMENTS

| 1827602 | 2/1961 | Fed. Rep. of Germany. | |
| 54-111873 | 9/1979 | Japan | 73/35 |
| 54-113378 | 9/1979 | Japan | 73/35 |
| 959454 | 6/1964 | United Kingdom. | |
| 1526289 | 9/1978 | United Kingdom. | |

Primary Examiner—Anthony V. Ciarlante
Attorney, Agent, or Firm—Thompson, Birch, Gauthier & Samuels

[57] ABSTRACT

A vibration sensor for detecting the magnitude of engine vibration and for generating an electric signal corresponding to the vibration incorporates a piezoelectric vibration element. The vibration sensor is used, for example, for detecting the knocking condition of an internal combustion engine. The piezoelectric element is secured onto an internal boss of a sensor housing by a threaded fastener. The fastener effectively secures the piezoelectric element onto the sensor boss so that the connection therebetween is not affected by vibration which could otherwise impair the electrical contact.

52 Claims, 41 Drawing Figures

FIG.17
FIG.16
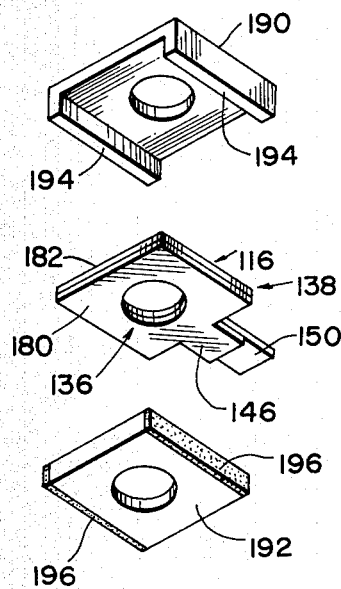
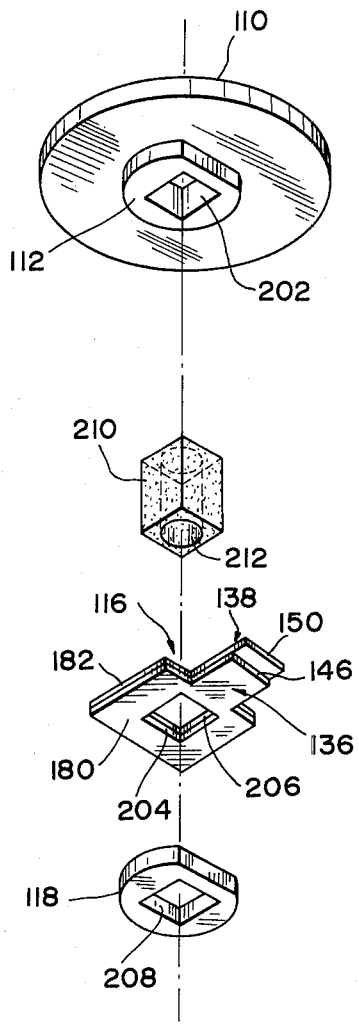

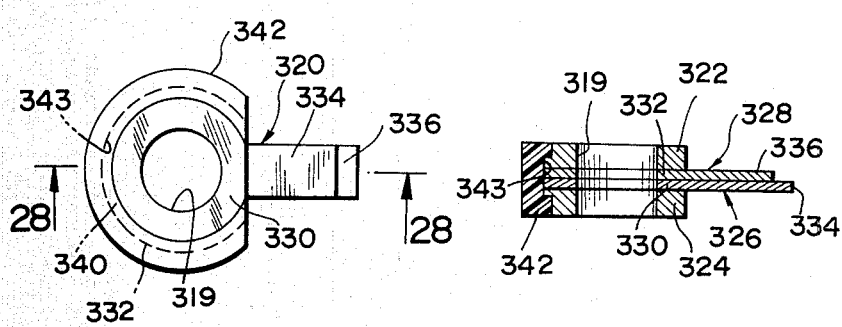

VIBRATION SENSOR

BACKGROUND OF THE INVENTION

1. Field of the Invention

The present invention relates generally to a vibration sensor for determining the magnitude of vibration. More specifically, the invention relates to a vibration sensor for determining the magnitude of vibration of an internal combustion engine, and which uses a vibrator including a piezoelectric vibration element.

2. Description of the Prior Art

Recently, vibration sensors have been used on automotive vehicles for sensing and determining the magnitude of engine vibration. In a spark ignition timing control system for the internal combustion engine, the engine vibration is one of the important parameters.

Generally, engine knocking will cause shortening of engine life, and particularly, when substantial knocking continues, the engine may be permanently damaged. However, from the view point of fuel economy and maximization of engine output characteristics, it is desirable to run the engine in a lightly knocking condition. As is well-known to those skilled in the art, for causing knocking of the internal combustion engine, the spark advance angle is altered. In general, engine knocking increases in correspondence with increases in the spark angle advance. Therefore, controlling the knocking condition can be accomplished by controlling spark advance angle. In the prior art, there have been developed and proposed various systems for keeping the internal combustion engine in a lightly knocking condition by feedback controlling the spark advance angle.

On the other hand, it is also well known that under the knocking condition, engine vibration rapidly increases depending on the internal pressure in the combustion chamber. In currently made vehicles, the engine vibration frequency corresponding to the knocking condition is generally within a range of 6 to 9 KHz. Utilizing this engine characteristic, there have been proposed various systems for detecting engine knocking condition by detecting the engine vibration. For detecting the engine vibration, there has been provided a vibration sensor for the internal combustion engine, which detects the above-mentioned specific range of engine vibration. The detected vibration frequency signal is converted into an analog value which is smoothed and compared with the vibration element of the specific frequency range to generate a signal. The signal is integrated per crank revolution. When the integrated value exceeds a predetermined value, the engine is regarded as knocking and the system generates an output knocking signal. Corresponding to this knocking signal, the spark advance angle is feedback controlled.

In the prior art, vibration sensors have been used for detecting knocking condition of the internal combustion engine. In a typical vibration sensor construction, the vibration sensor comprises a sensor body defining an internal space with a cover member and a vibrator disposed in the internal space of the sensor body. The vibrator generally comprises a metal plate and a piezoelectric vibration element which generates an electric signal corresponding to the vibration applied thereto. Conventionally, the vibrator is bonded onto a vibrator base formed on either the sensor body or the cover member. For securing the vibrator onto the vibrator base, an electrically conductive adhesive is used. The vibrator is connected to the control system, such as the spark ignition timing control system, through a lead inserted into the internal space of the vibrator body. The end of the lead is secured to the vibrator by welding or a similar method.

The sensor thus constructed is secured to an engine cylinder block with an achor bolt formed integrally with the sensor body. The electric signal generated in the vibrator is transmitted to the control system through the lead.

Since the electrically conductive adhesive has a relatively low heat resistance, under extreme heat conditions, it breaks down, causing the vibrator to be jarred loose from the vibrator base. In addition, the relatively high temperature will affect the vibrator's resonant frequency and decrease the vibrator's durability.

Further, the end of the lead is welded or soldered to the piezoelectric element with relatively high heat. This will possibly damage the piezoelectric element and therefore makes it difficult to fit the lead onto the piezoelectric element.

SUMMARY OF THE INVENTION

Therefore, it is a general object of the present invention to provide a vibration sensor which can maintain an output responsive to vibration applied thereto, without the possibility of undesirably or unexpectedly becoming detached from an internal surface of the sensor housing.

For accomplishing the above-mentioned and other objects of the present invention, there is provided a vibration sensor generally comprising a sensor housing and a vibrator secured on the internal surface of the sensor housing. For securing the vibrator onto the internal surface of the sensor housing, there is further provided a fastener which has a threaded portion engageble with the sensor housing.

In a preferred construction, the vibrator comprises a piezoelectric element of substantially thin plate form having electrodes on both planar surfaces thereof and a metal plate having approximately the same thermal expansion ratio as that of the piezoelectric element.

The vibration sensor constructed as above is applicable for determining vibration frequency of an internal combustion engine. For using the sensor output as a control parameter in an electric or electronic engine control system such as a spark ignition timing control system, the vibrator has a resonating point substantially corresponding to the engine vibration frequency in engine knocking condition.

BRIEF DESCRIPTION OF THE DRAWINGS

The present invention will become fully understood from the detailed description given below and from the accompanying drawings of the preferred embodiments of the present invention, which, however, are not to be taken as limitative of the present invention but for elucidation and explanation only.

In the drawings:

FIG. 16 is an exploded view of a vibrator-and-retainer assembly used in the vibration sensor of FIG. 14;

FIG. 17 is an exploded view of a further modification of a construction mounting the vibrator to the vibrator base, according to the second embodiment of the present invention;

FIG. 27 is an enlarged plan view of a vibrator-and-retainer assembly used in the vibration sensor of FIG. 24;

FIG. 28 is an enlarged sectional view of the vibrator-and-retainer assembly of FIG. 27 taken along line 28—28;

FIG. 29 is an enlarged perspective view of the retainer used in the vibrator-and-retainer assembly of FIG. 27;

FIG. 30 is an enlarged plan view of a modification of the vibrator-and-retainer used in the second embodiment of the vibration sensor according to the present invention;

FIG. 31 is an enlarged sectional view of the vibrator-and-retainer assembly of FIG. 30 taken along line 31—31;

DETAILED DESCRIPTION OF THE INVENTION

Figure 36:
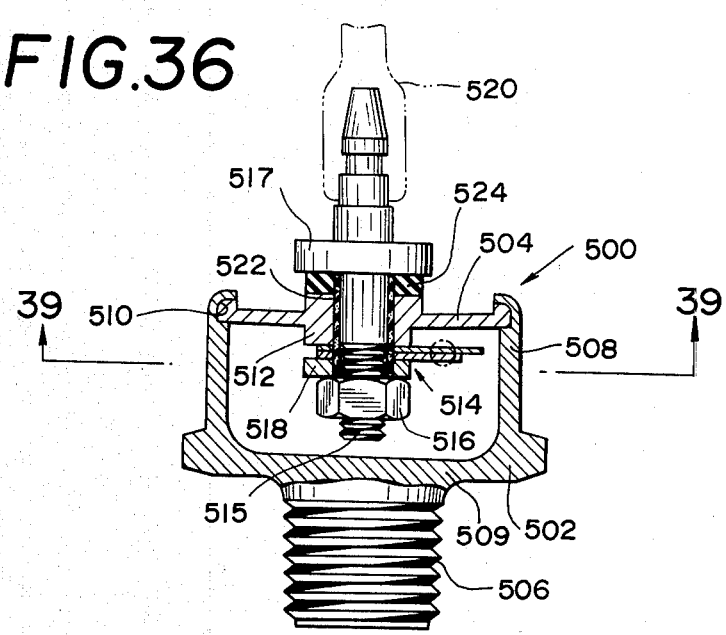
FIG. 36 is a sectional view of a preferred embodiment of the vibration sensor according to the present invention.
Figure 37:
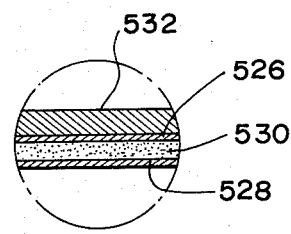
FIG. 37 is an enlarged sectional view of a vibrator used in the vibration sensor of FIG. 36.
Figure 38:
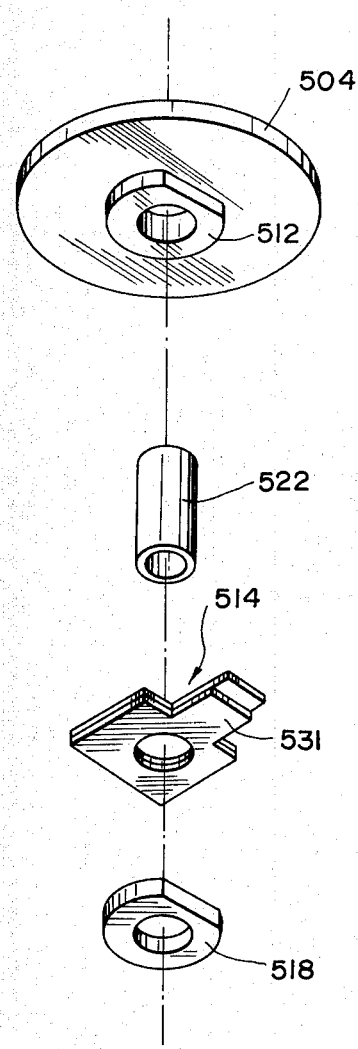
FIG. 38 is an exploded view of a mounting structure for mounting the vibrator onto the vibrator base of the preferred embodiment.
Figure 39:
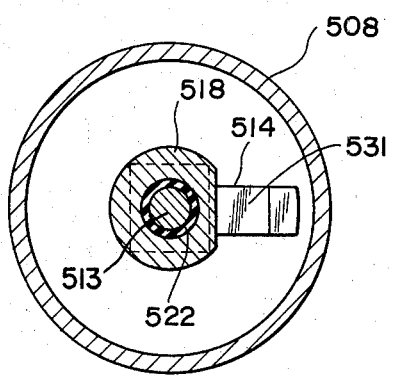
FIG. 39 is a sectional view of the vibration sensor of FIG. 36 taken along line 39—39.

Referring to FIG. 36 a preferred embodiment of the vibration sensor of the present invention is shown generally illustrated by the numeral 500. The vibration sensor 500 generally comprises a body 502 having a cylindrical section 508 and a closed end section 509. A threaded shaft 506 is formed with the closed end section 509 to serve as a means for attaching the vibration sensor 500 to a vehicle engine or other vibrating source.

The cylindrical section 508 is formed with a retainer edge cap 510 adjacent the open end opposite the closed end section 509 for retaining a disc 504 therein. The disc 504 includes a base 512 at the center thereof for mounting a vibrator flat section 514. The vibrator flat section 514 comprises a vibrator electrically conductive thin metal element 532 having a piezoelectric vibration element 531 bonded thereto. The piezoelectric vibration element 531 comprises a first electrode 526, a second electrode 528 and a piezoelectric body 530 sandwiched therebetween. The vibrator flat section 514 is attached to the disc base 512 by bonding thereto with an electrically conductive bonding adhesive to ensure an adequate electrical connection therebetween. The vibrator flat section 514 is retained in position by a threaded fastener 513, comprising a bolt 517 having a threaded shaft 515 to which a nut 516 is attached.

Since the body 502 serves as an electrical contact of the vibration sensor 500, the vibrator flat section 514 must be isolated therefrom in all areas of the contact except the bonded area between the base 512 and the electrically conductive thin metal element 532. Therefore, an insulator means 522 is provided around the threaded shaft 515 to isolate the vibrator flat section 514 therefrom. However, the vibrator flat section 514 must be electrically connected to the side opposite the electrically conductive thin metal element 532 for proper operation. Therefore, a washer 518 is positioned thereagainst and retained in place by the nut 516 so that electrical contact is made between the piezoelectric body 530 through the washer 518, the nut 516, the threaded shaft 515 and to a connector wire 520 connected thereto. Since the bolt 517 must also be isolated from the body 502, an insulating washer 524 is provided between the bolt 517 and the disc base 512 to prevent electrical communication therebetween.

Figure 1:
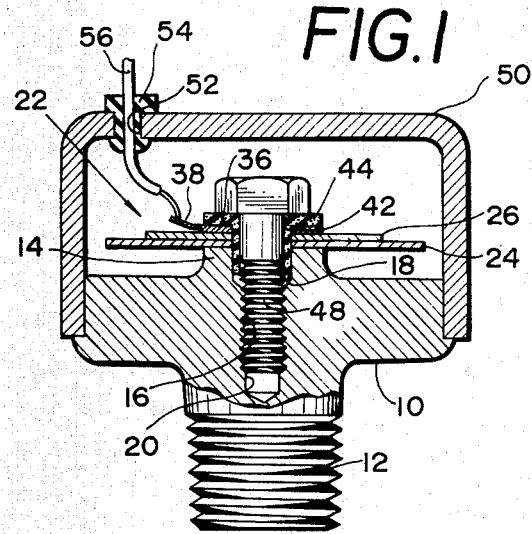
FIG. 1 is a sectional view of a sixth embodiment of a vibration sensor according to the present invention.
Figure 3:
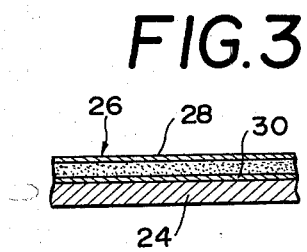
FIG. 3 is an enlarged sectional view of the vibrator for use with the vibration sensor of FIG. 1.
Figure 2:
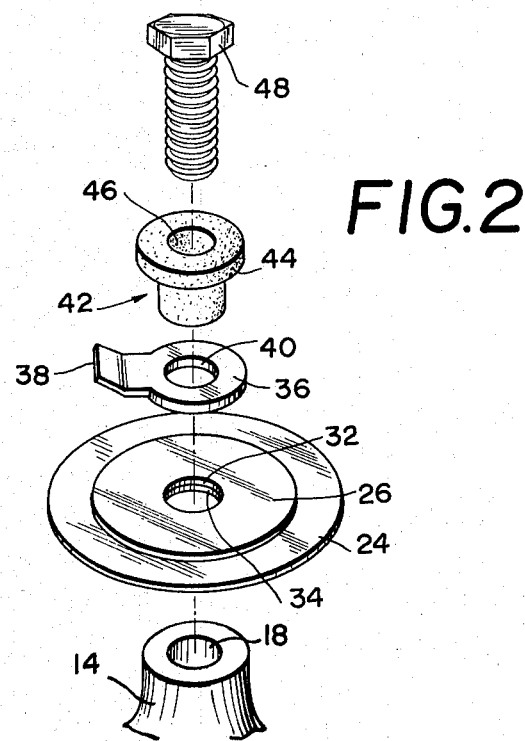
FIG. 2 is an exploded view of the vibration sensor of FIG. 1.

FIGS. 1-3 illustrate a sixth embodiment of a vibration sensor according to the present invention. A sensor body 10 has an anchor bolt 12 extending from the central portion of a planar surface thereof to secure the sensor body 10 to a cylinder block (not shown) of an internal combustion engine for transmitting engine vibration through the anchor bolt to the vibration sensor. The sensor body 10 and the anchor bolt 12 are formed integrally from an electrically conductive material.

A vibrator base 14 of generally cylindrical or conical shape forms the central portion of the opposite side surface of the sensor body 10. A stepped bore 16 having two portions 18 and 20 of different diameters is coaxially formed in the vibrator base 14 and extends through the sensor body 10. A vibrator 22 is mounted on the vibrator base 14, which vibrator 22 comprises an electrically conductive thin metal disc 24 and a disc-shaped piezoelectric vibration element 26. As shown in detail in FIG. 3, both planar surfaces of the piezoelectric vibration element 26 are coated by an electrically conductive material having good conductive characteristics, such as silver, to form electrodes 28 and 30 thereon. As shown in FIGS. 1 and 2, the piezoelectric vibration element 26 has a diameter larger than that of the vibrator base 14 and extends therefrom in a radial direction. The metal disc 24 has a larger diameter than that of the piezoelectric vibration element 26. The metal disc 24 and the piezoelectric vibration element 26 are bonded together at opposing surfaces thereof. Preferably, an electrically conductive adhesive is used for bonding the metal disc and the piezoelectric vibration element 26 together to provide good conductivity therebetween. Both the metal disc 24 and the piezoelectric vibration element 26 are formed with respective openings 32 and 34 of the same diameter as that of the portion 18 of the base bore 16. An electrically conductive element 36 having a bent extension 38 is mounted on the vibrator 22 to contact one planar side surface of the electrode 28. The metal element 36 also includes an opening 40 of the same diameter as that of the portion 18 of the bore 16. Through the openings 32 and 34 of the vibrator 22 and the opening 40 of the metal element 36, a cylindrical insulating member 42 having an upper annular flange portion 44 fits into the portion 18 of the bore to insulate the electrode 28 from the sensor body 10. The flange portion 44 of the insulating member 42 has a diameter substantially the same as that of the vibrator base 14. The insulating member 42 is formed with an elongated opening 46 concentric with the main body portion. A screw 48 passes through the opening 46 of the insulating member 42 and engages an internal thread formed in the portion 20 of the bore 16. Thus, the vibrator 22 is sandwiched between the vibrator base 14 and the flange portion 44 of the insulating member 42 and is thereby fixed on the vibration base.

A cup-shaped cover member 50 made of an electrically conductive material is installed on the assembled vibration sensor body 10 and is secured thereto. Preferably, the sensor cover material is the same as the sensor body. The cover member 50 is formed with an opening 52 having an insulating bushing 54. An output lead 56 passes through the insulating busing 54 and is connected to the bent extension 38 of the metal element 36.

It is recommended that the vibration sensor according to the present invention be approximately 30 mm in overall diameter, and that the screw or thread element be approximately 6 mm in diameter. Further, the total weight of the base and vibrator assembly should be approximately 15 grams and the total weight of the vibration sensor should be approximately 30 grams.

On assembling, first, the vibrator 22 is installed on the vibrator base 14 and then the metal element 36 is installed thereon. The vibrator 22 is bonded to the vibrator base 14 after centering. Thereafter, the insulating member 42 is inserted through the openings 32, 34 and 40 and screw 48 is installed through the insulating member and into the thread of the portion 20 of the bore 16. Since the metal disc 24 of the vibrator 22 faces the electrically conductive sensor body 10 through the vibrator base 14, the electrode 30 is connected to the engine cylinder block, and thus to ground.

Alternatively, by first installing the insulating member 42, the vibrator can be accurately and effectively centered with respect to the axis of the vibrator base 14. Namely, the insulating member 42 is inserted through the metal element 36, the vibrator 22 and into the portion 18 of the bore 16 to align the axes thereof with the axis of the bore. Since the inner diameter of the openings 32 and 34 are substantially the same as the outer diameter of the insulating member 42, the vibrator 22 can be accurately centered with respect to the axis of the bore 16.

In the shown embodiment, the resonating frequency of the vibrator 22 is determined by the thickness of the metal disc and the piezoelectric element and the diametrical relationship between the metal disc and the piezoelectric element. Therefore, the thicknesses and diameters of the metal disc and the piezoelectric element are determined so that the vibrator resonates to the engine vibration frequency generated while the engine is driven in knocking condition, e.g., within a range of 5 KHz to 9 KHz.

In response to engine vibration transmitted through the anchor bolt 12, the metal disc 24 of the vibrator 22 vibrates to deform the piezoelectric element 26. Corresponding to the amount of deformation, the piezoelectric element 26 generates a potential between the electrodes 28 and 30 formed on both planar surfaces thereof. The electric signal generated by the piezoelectric element 26 is fed to an engine control system for controlling the internal combustion engine with the engine knocking condition as a control parameter therefor, such as a spark ignition timing control system, through the metal element 36 and the lead 56. The potential of the signal generated by the piezoelectric element 26 corresponds to magnitude of engine vibration.

Figure 4:
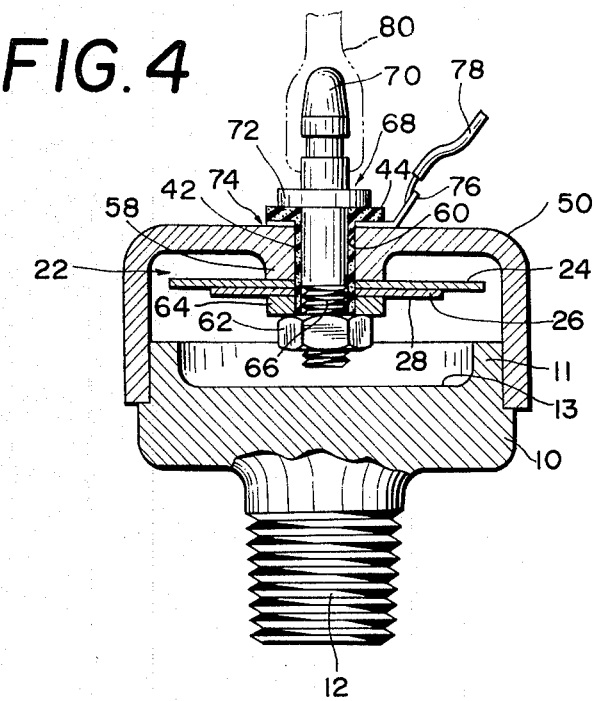
FIG. 4 is a sectional view of a seventh embodiment of the vibration sensor.

FIG. 4 shows a seventh embodiment of a vibration sensor as a modification of the sixth embodiment of FIGS. 1 to 3. In this embodiment, the parts corresponding to the sixth embodiment will be represented the same reference numerals for simplification of the following explanation and for avoiding confusion.

The sensor body 10 includes the anchor bolt 12 at the central portion of the planar surface. The sensor body 10 is formed with an annular projection 11 extending along the outer periphery thereof to define a recess 13 therein. A substantially disc-shaped cover member 50 is mounted on the sensor body 10 and secured thereto. The cover member 50 is provided with a vibrator base 58 extending inwardly from the central portion of the inner planar surface thereof. The vibrator base 58 is of a generally cylindrical or truncated conical shape and is formed with an elongate opening 60 along the axis thereof. The vibrator 22 is secured at the inner end of the vibrator base 58 and held by a nut 62 through a retainer 64 of a generally cylindrical shape. The nut 62 engages a threaded portion 66 of a connector 68 extending through the opening 60. The connector 68 has a head portion 70 extending outwardly from the cover member 50. A generally cylindrical insulating member 42 having a flange portion 44 is interposed between the inner periphery of the opening 60 and the connector 68. The insulating member 42 extends along the axis of the bore to insulate the inner periphery of the vibrator 22 from the connector 68.

The connector 68 has a flange portion 72 at the intermediate portion between the threaded portion 66 and the head portion 70. The flange portion 72 of the connector 68 faces the flange portion 44 of the insulating member 42 to urge the latter onto the outer surface of the cover member 50 by tightening the nut 62. Between the flange portion 44 of the insulating member 42 and the outer surface of the cover member 50, there is interposed a metal element 74 having a bent portion 76 to be connected with a lead 78 for connecting the cover member 50 to ground.

Thus, the output generated in the piezoelectric element 26 of the vibrator 22 is transmitted to the head portion 70 of the connector 68 through the electrode 28, the retainer 64, the nut 62 and the threaded portion 66. The output is further transmitted to the engine control system with the output as one of the control parameters through a lead 80 connected to the head portion 70 of the connector 68.

According to the above-explained embodiments, since the vibrators 22 are respectively secured to the vibrator bases 14 and 58, they are fixedly held on the vibrator bases without loosening therefrom even when the vibrators are subjected to high engine temperatures transmitted through the anchor bolts. Further, by using the insulating members, the vibrators can be accurately and easily centered onto the vibrator bases so that they can detect resonating frequencies in any direction.

Figure 5:
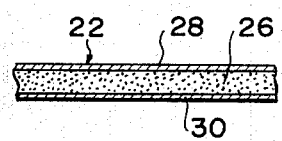
FIG. 5 is an enlarged sectional view of a first modified vibrator for use with the vibration sensor of FIG. 4.
Figure 6:
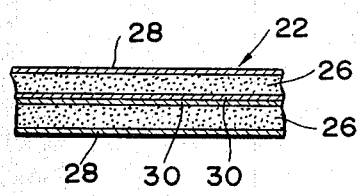
FIG. 6 is an enlarged sectional view of a second modified vibrator for use with the vibration sensor of FIG. 4.
Figure 7:
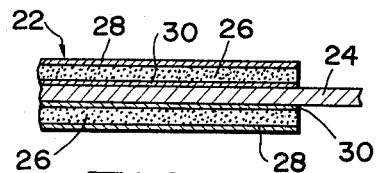
FIG. 7 is an enlarged sectional view of a third modified vibrator for use with the vibration sensor of FIG. 4.
Figure 8:
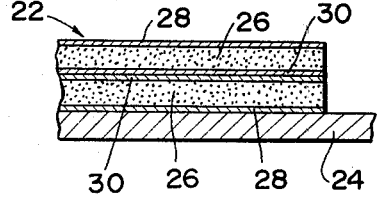
FIG. 8 is an enlarged sectional view of a fourth modified vibrator for use with the vibration sensor of FIG. 4.

It should be noted that the vibrator is not necessarily constructed as shown in FIG. 3. For example, it can be constructed as shown in FIGS. 5 to 8. In FIG. 5, there is shown a vibrator 22 constructed only of the piezoelectric element 26 with the conductive coated electrodes 28 and 30 on both surfaces thereof. FIG. 6 shows a vibrator 22 comprising two piezoelectric elements 26, each of which has electrodes 28 and 30 on both surfaces thereof. The electrodes 30 of the upper and lower piezoelectric elements 26 are facing together. By this construction, the potential of the output signal can be increased. The same effect as that expected in the construction of FIG. 6 can be also expected in vibrators 22 of FIGS. 7 and 8. FIG. 7 shows the vibrator comprising two piezoelectric elements 26 and a metal disc 24 interposed between the piezoelectric elements 26. The electrodes 30 of the piezoelectric elements 26 face the planar surfaces of the metal disc. FIG. 8 shows another arrangement of the same elements in FIG. 7. In FIG. 8, the metal disc 24 faces the lower-most electrode 28 of the lower piezoelectric element 26.

Figure 9:
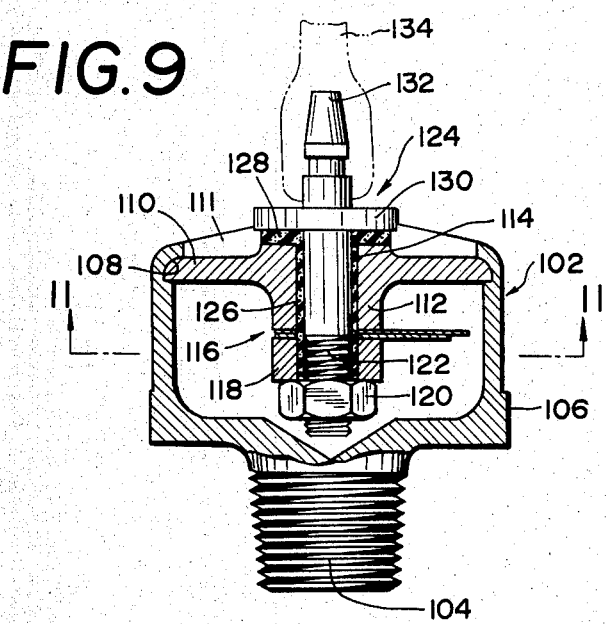
FIG. 9 is a sectional view of a second embodiment of the vibration sensor according to the present invention.
Figure 10:
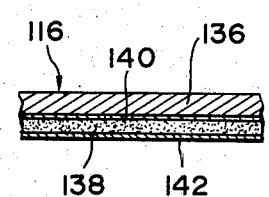
FIG. 10 is an enlarged sectional view of the vibrator shown in FIG. 9.
Figure 11:
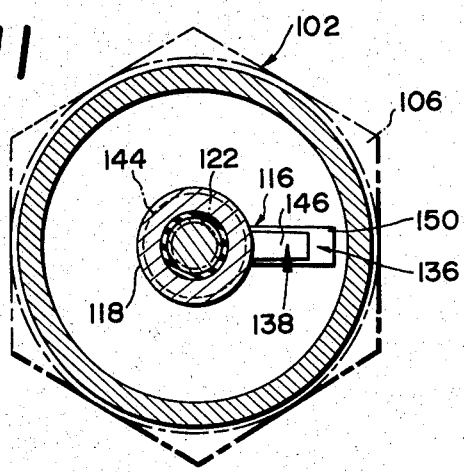
FIG. 11 is a sectional view of the vibration sensor of FIG. 9 taken along line 11—11.

Now referring to FIGS. 9 to 11, there is illustrated the second embodiment of a vibration sensor according to the present invention. A sensor body 102 is formed with a substantially circular cup shaped configuration with an anchor bolt 104 extending outwardly from the bottom thereof. The periphery of the sensor body 102 is formed with a hexagon-shaped portion 106 adjacent the bottom thereof. An annular groove 108 is formed on the inner periphery to retain a sensor cover 110 with a water-proofing filler 111, adjacent the top thereof.

The sensor cover 110 is formed with a vibrator base 112 at the central portion thereof. The vibrator base 112 is of generally cylindrical shape. Aligned with the transverse axis of the vibrator base 112, an elongated opening 114 is formed through the vibrator base 112 and the sensor cover 110. A vibrator 116 is secured on the inner end of the vibrator base 112 and is fixed thereon with an electrically conductive retainer 118 by a nut 120 of an electrically conductive material. The nut 120 engages a threaded portion 122 of a connector 124 passing through the opening 114 and extending inwardly from the vibrator base 112. An elastic insulating member 126 of a generally cylindrical shape is interposed between the inner periphery of the opening 114 and the threaded portion 122 of the connector 124 to insulate the vibrator 116 from the connector 124. The insulating member 126 has a flange portion 128 mounted on the outer end of the opening 114. The flange portion 128 is sandwiched between the outer end of the opening and a flange portion 130 of the connector 124. The connector 124 further has a head portion 132 to be connected with a lead 134 for connecting the sensor to the engine control system using the knocking signal as one of the control parameters, such as the spark ignition timing control system for the internal combustion engine.

As shown in FIG. 10, the vibrator 116 comprises a metal plate 136 and a piezoelectric element 138 which is coated on both surfaces with a conductive material such as silver to form electrodes 140 and 142 thereon. The metal plate 136 faces the electrode 140 on one side surface thereof and the other electrode 142 of the piezoelectric element faces the retainer 118. Therefore, the output signal generated in the piezoelectric element 138 corresponding to engine vibration is outputted from the lead 134 through the electrode 142 the retainer 118, nut 120 and connector 124. The vibrator 116 is connected to ground through the electrode 140, sensor cover 110 and sensor body 102.

As shown in FIG. 11, the piezoelectric element 138 and the metal plate 136 each comprise a circular portion 144 and 148 and a substantially rectangular tongue portion 146 and 150. Each circular portion 144 and 148 is formed with a central opening 152 and 154 for receiving the connector 124. By the construction of the vibrator 116 herein disclosed, advantages can be expected that, since the vibrator 116 is secured to the vibrator base 112 in cantilever fashion and the tongue portions 146 and 150 extend toward one direction, the resonating frequency of the vibrator is always even, and further it is easy to adjust the resonating frequency by adjusting the length of the tongue portions. Namely, by shortening the length of the vibrator tongue portion, the resonating frequency of the vibrator can be increased by a constant ratio. Therefore, even after assembling the vibrator onto the vibrator base, one can easily adjust the resonating frequency for accuracy of detecting engine vibration. For adjusting the resonating frequency in the assembling operation, the vibrator is shortened by, for example, filing or the like. The resonating frequency can also be determined by applying alternating current to the vibrator and measuring the impedance thereof. The resonating frequency will correspond to the frequency of alternating current applied to the vibrator when the impedance thereof becomes maximum.

Figure 12:
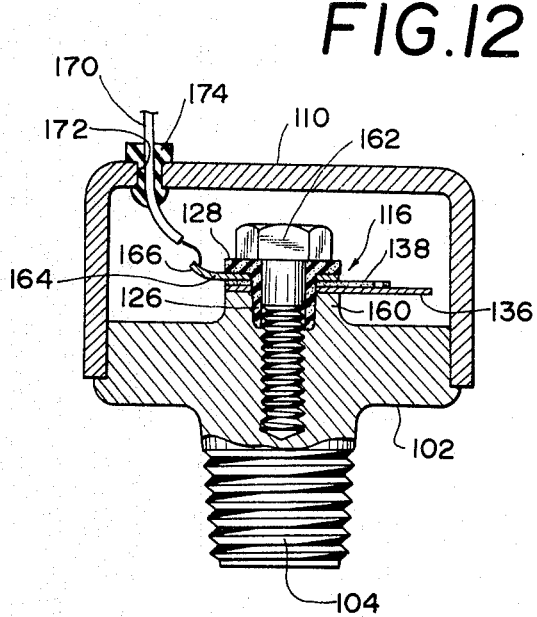
FIG. 12 is a sectional view of a third embodiment of the vibration sensor according to the present invention.

FIG. 12 shows a third embodiment of the vibration sensor of FIGS. 9 to 11. In this embodiment, the vibrator 116 is mounted on the vibrator base 160 formed on the sensor body 102. The vibrator 116 is fixedly secured onto the vibrator base 160 by a screw 162 through the elastic insulating member 126. Between the flange portion 128 and the top of the vibrator base 160 is interposed a metal element 164 having bent portion 166. The bent portion 166 of the metal element 164 is connected to an output lead 170 through which a sensor signal generated by the piezoelectric element 138 is transmitted to the engine control system. The output lead 170 extends from the sensor cover 110 through a hole 172 with a insulating bushing 174.

In this modification, the construction of the vibrator 116 is substantially the same as the foregoing embodiment as described with reference to FIGS. 9 to 11. Therefore, the same advantages can be expected therein.

Figure 13:
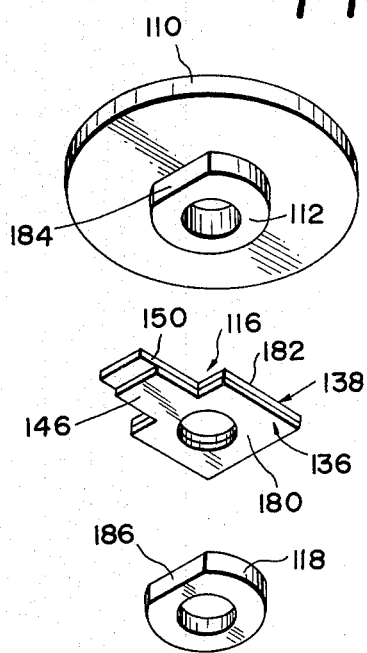
FIG. 13 is an exploded view showing a modified construction of the vibrator and a modified construction for mounting the modified vibrator onto a vibrator base.

FIG. 13 shows a modification of the vibrator 116 of the foregoing embodiments. In this modification, the vibrator 116 comprises the piezoelectric element 138 and the metal plate 136, each having a square portion 180 and 182 and a substantially rectangular tongue portion 146 and 150. Corresponding to this, the retainer 118 and the vibrator base 112 are formed with cutaways 184 and 186. According to this modification, since the length of the tongue portion 146 and 150 in proportion can be kept constant, the accuracy of adjustment of the resonating frequency increases.

Figure 14:
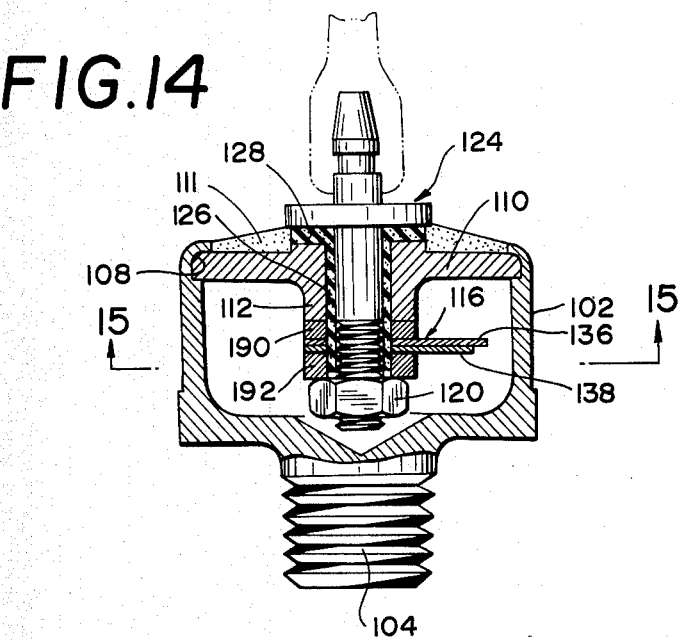
FIG. 14 is a sectional view of a fourth embodiment of the vibration sensor according to the present invention.
Figure 15:
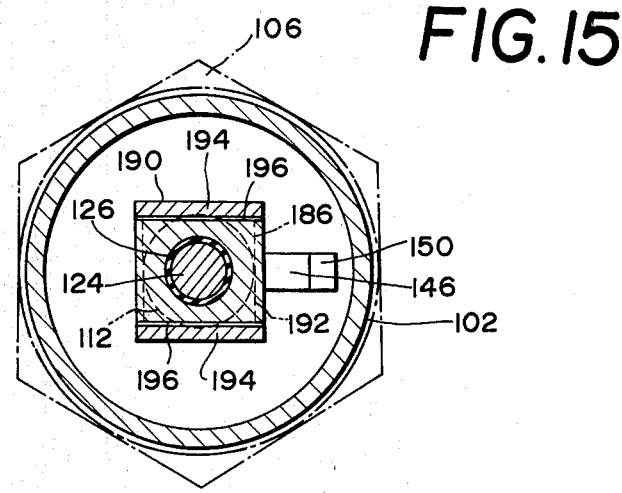
FIG. 15 is a sectional view of the vibration sensor of FIG. 14 taken along line 15—15.
Figures 18, 19:
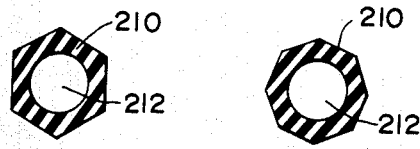
FIGS. 18 to 22 are enlarged sectional views of insulating members used in the modified constructions for mounting the vibrator onto the vibrator base as shown in FIG. 17.
Figures 20, 21:
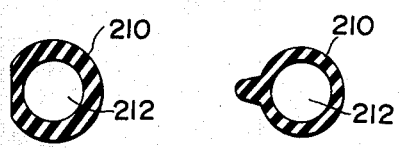
Figure 22:
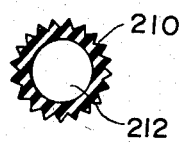

FIGS. 14 to 16 show a fourth embodiment of the vibration sensor of the present invention. It should be noted that, for simplification of the following explanation and for avoiding confusion in the reference numerals, corresponding parts or elements of the foregoing embodiments will be represented by the same reference numerals. As in the embodiment shown in FIGS. 9 to 11, the vibrator 116 is secured on the vibrator base 112 formed on the sensor cover 110. The vibrator 116 is held between two retaining members 190 and 192. The retaining member 190 has angled portions 194 on both sides thereof. The square portions 180 and 182 are placed in a recess defined by the angled portion 194 of the retaining member 190. The retaining member 192 has a side edge portion on which is provided an electrically insulating member such as paper tape 196. The retaining member 192 is placed on the opposite side of the vibrator and faces to the surface of the square portion of the piezoelectric element. The vibrator and retaining member assembly are secured on the vibrator base 112 by a nut 120. The nut 120 engages the threaded portion 122 of the connector 124.

FIG. 17 shows a further modification of the second embodiment of the present invention. There is illustrated an exploded view of the structure for mounting the vibrator 116 onto the vibrator base 112 formed from the inner surface of the sensor cover 110. The vibrator base 112 is formed with a substantially square opening 202 extending through the sensor cover 110. The vibrator 116 has the same construction as explained with reference to FIG. 13. The vibrator 116 comprises the resonating element 138 and the metal plate 136, each of which has a square portion 180 and 182 and a substantially rectangular tongue portion 146 and 150. The square portions 180 and 182 of the resonating element 138 and the metal plate 136 are formed with square openings 204 and 206 extending therethrough. Likewise, the retainer 118 is formed with the square shaped opening 208. Through the openings 202, 204, 206 and 208, a square shaped insulating member 210 is inserted. The insulating member 210 is formed with an elongate circular opening 212 to receive the threaded portion of the connector (not shown in FIG. 17.) By this construction, the vibrator 116 is prevented from rotating about the insulating member 210 and thereby the resonating frequency of the vibrator is maintained constant.

For achieving the above-mentioned advantages, it is not a limitation to use the square shaped insulating member. Various modifications can be substituted from the viewpoint of preventing the vibrator from rotating thereabout. FIGS. 18 to 22 show variations of the insulating members 210. As seen from the present modifications, by providing the angled portion to the insulating member, the vibrator is prevented from rotating.

Figure 23:
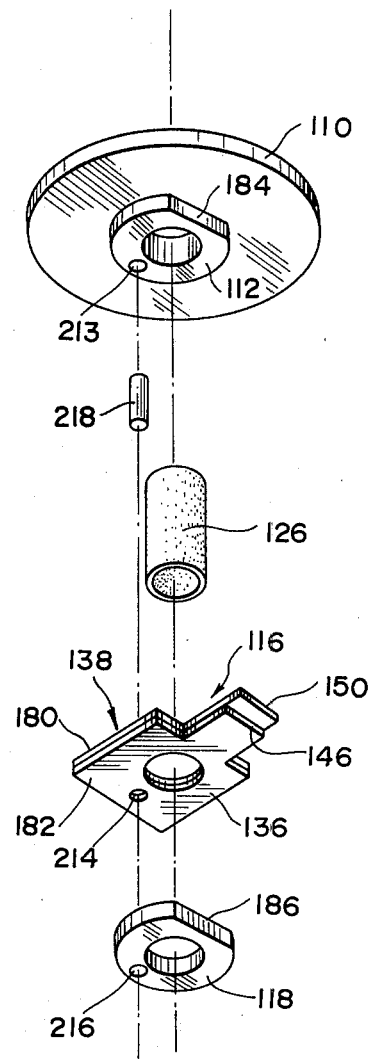
FIG. 23 is an exploded view of a still further modification of the mounting construction for the vibrator of the second embodiment.

FIG. 23 shows a still further modification of the second embodiment of the present invention. The sensor cover 110 includes the vibrator base 112 on the inner surface thereof. As in the vibrator base of FIG. 13, the vibrator base 112 is formed with the cutout portion 184 for providing the constant length of the tongue portion of the vibrator 116 of the same construction of FIG. 13. The vibrator 116 and the vibrator base 112 are formed with aligned openings 213 and 214 extending therethrough. The retainer 118 is also formed with an opening 216 of the same diameter as the opening 213 and 214 and aligned therewith.

In the assembling operation, the vibrator 116 is secured between the inner end of the vibrator base 112 and the retainer 118 in alignment with the openings 212, 214 and 216. Through the aligned openings 212, 214 and 216, a pin 218 is inserted to determine the direction of the tongue portions 146 and 150 of the resonating element 138 and the metal plate 136. As in the preceding embodiment, the vibrator 116 is prevented from rotating about the axis thereof.

FIGS. 24 to 29 show a fifth embodiment of the vibration sensor according to the present invention having a means for preassembly adjustment of the vibration frequency.

Figure 25:
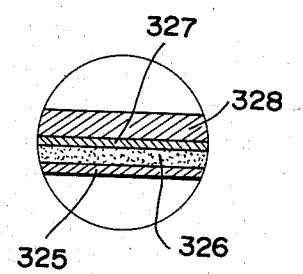
FIG. 25 is an enlarged sectional view of the vibrator employed in the vibration sensor of FIG. 24.
Figure 26:
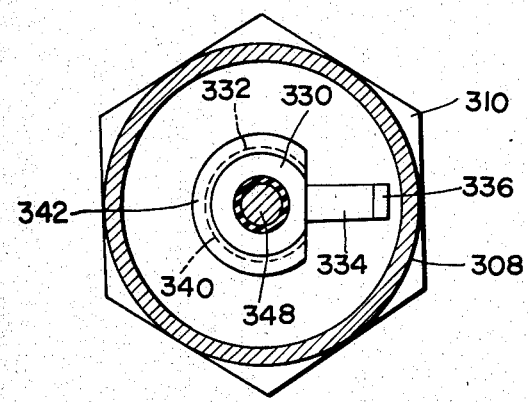
FIG. 26 is a sectional view of the vibration sensor of FIG. 24 taken along line 26—26.

As generally shown in FIGS. 25 and 26, the vibration sensor comprises a sensor body 300 having an anchor bolt 302 and a sensor cover 304. The sensor body 300 has a substantially circular base portion 306 and vertical periphery 308. As clearly shown in FIG. 26, a hexagon-shaped portion 310 is formed at the lower portion of the periphery 308 for tightening the anchor bolt 302 to a cylinder block of an internal combustion engine. Adjacent the upper end of the periphery 308, there is formed an annular groove 312 to which the sensor cover 304 is engaged at the peripheral portion thereof.

The sensor cover 304 has a planar inner surface 314 and a central opening 316 extending therethrough. In alignment with the central opening 316 at the opening 319, a vibrator-and-retainer assembly 318 is mounted on the inner planar surface of the sensor cover 304. The vibrator-and-retainer assembly 318 comprises a vibrator 320 and a pair of retainers 322 and 324. The vibrator 320 has a piezoelectric element 326 and a metal plate 328. Both the piezoelectric element 326 and the metal plate 328 have semi-circular portions 330 and 332 and substantially rectangular tongue portions 334 and 336. Each planar surface of the piezoelectric element 326 has a coated layer of an electrically conductive material such as silver to form electrodes 325 and 327 thereon. The retainers 322 and 324 are opposed at the portion providing the flange portions 338 and 340. The retainers 322 and 324 hold and clamp therebetween the semi-circular portions 330 and 332 of the vibrator 320. In the position that the retainers 322 and 324 hold the vibrator 320, a holding ring 342 engages the flanged portions 338 and 340 to retain the vibrator-and-retainer assembly 318 in the assembled condition as shown in FIGS. 27 and 28. The holding ring 342 is made of synthetic resin or the like such as phenol resin. Preferably, the synthetic resin made into the holding ring includes a suitable reinforcement material such as glass fiber. The holding ring 342 is of an annular configuration and has a groove 343 on the inner periphery thereof. The groove 343 has a vertical width corresponding to the thickness of the vibrator 320 and the flange portions 338 and 340, as clearly shown in FIG. 28, and covers most of the semi-circular portion of the vibrator-and-retainer assembly 318.

Thus assembled, the vibrator-and-retainer assembly 318 is secured to the inner surface of the sensor cover 304 by a nut 344. The nut 344 engages a threaded portion 346 of a connector 348 through which the sensor is connected with engine control system through a lead 350 connected to the head 352 thereof.

Figure 24:
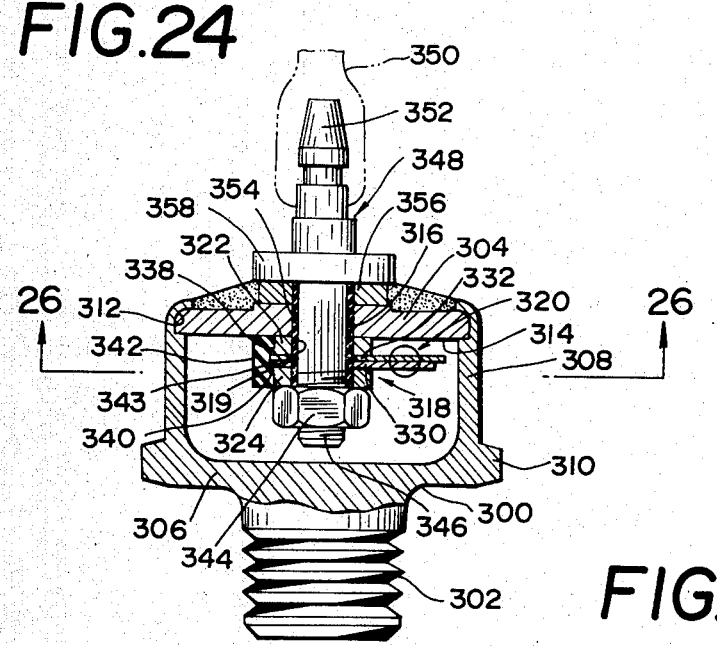
FIG. 24 is a sectional view of a fifth embodiment of the vibration sensor according to the present invention.

As shown in FIG. 24, an insulator cylinder 354 is interposed between the threaded portion 346 and the aligned openings 316 and 319 of the sensor cover 304 and the vibrator-and-retainer assembly 318 for insulating the electrode 327 from the sensor cover 304. For completing the insulation between the electrode 327 and the sensor cover 304, an insulator ring 356 is mounted on the outer surface of the sensor cover 304 in a position between a flange portion 358 of the connector 348 and the sensor cover 304.

The electrode 327 is connected to the lead 350 through the retainer 324, the nut 344 and the connector 348. The other electrode 325 is connected to the engine cylinder block to ground the electricity through the sensor cover 304, the sensor body 300 and the anchor bolt 302.

According to the thus constructed fifth embodiment of the present invention, since the vibrator 320 is fixedly held between a pair of retainers 322 and 324, adjusting the resonating frequency of the vibrator 320 can be performed in disassembled position from the vibrator base. Therefore, manufacturing efficiency is increased and adjustment of the resonating frequency is more accurate.

FIGS. 30 and 31 show a modification of the vibrator-and-retainer assembly for use with the second embodiment of the present invention. The vibrator-and-retainer assembly 318 has a vibrator 320 comprising the piezoelectric element 326 and the metal plate 328. The piezoelectric element 326 has electrodes 325 and 327 on each planar surface thereof. The piezoelectric element 326 and the metal plate each comprise a semi-circular portion 330 and 332 and a tongue portion 334 and 336.

The piezoelectric element 326 and the metal plate 328 are bonded together at opposing surfaces to form the vibrator 320. The semi-circular portion of the vibrator 320 is surrounded by a retainer 370 of synthetic resin such as phenol resin. The semi-circular portion of the vibrator 320 is inserted into a mold and the resin is injected into the mold to be formed into the retainer surrounding the semi-circular portion. The retainer 370 is formed with openings 372 and 374 through which parts of the semi-circular portion of the vibrator 320 are exposed. Annular ring shaped electrodes 376 and 378 have extensions 380,382 welded to the exposed parts of the semi-circular portion of the vibrator 320.

Figure 32:
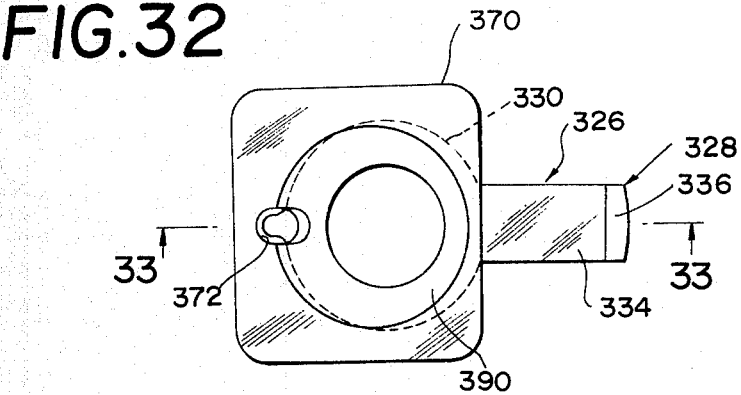
FIG. 32 is an enlarged plan view of another modification of the vibrator-and-retainer assembly used in the second embodiment of the vibration sensor according to the present invention.
Figure 33:
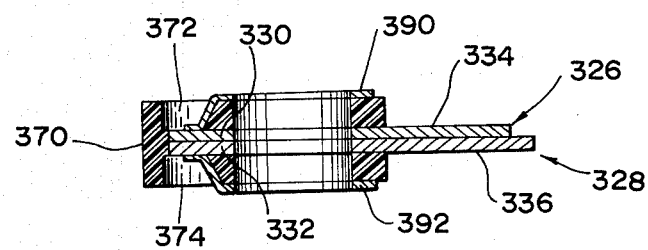
FIG. 33 is an enlarged sectional view of the vibrator-and-retainer assembly of FIG. 32 taken along line 33—33.

FIGS. 32 and 33 show a further modification of the vibrator-and-retainer assembly of FIGS. 30 and 31. In this modification, the construction of the vibrator 320 and the retainer 370 is substantially the same as that of the FIGS. 30 and 31 embodiment. Electrodes 390 and 392 are formed on the outer surfaces of the retainer 370 and extend to the exposed parts of the semi-circular portion of the vibrator 320.

In both modifications, the same advantages can be expected as the foregoing second embodiment.

Figure 34:
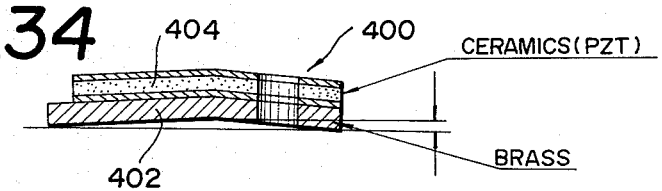
FIG. 34 is an enlarged sectional view of a vibrator of conventional construction.

FIG. 34 shows a vibrator 400 comprised generally of a brass plate 402 having a thermal expansion coefficient of $19 \times 10^{-6}/°C$. and a piezoelectric vibration element 404 made from ceramic (PZT) having a thermal expansion coefficient of 0.5 to $3 \times 10^{-6}/°C$. The brass plate 402 and the ceramic element are bonded together by a thermosetting adhesive. Therefore, the assembled vibrator 400 has bimetallic characteristics due to the considerable difference in the thermal expansion coefficients of its components and therefore is influenced by the atmospheric temperature and the engine temperature transmitted through the anchor bolt and the sensor body. This possibly causes varying of the resonating frequency of the vibrator corresponding to varying temperatures to decrease the accuracy of engine vibration detection. Moreover, bending of the vibrator 400 will apply a shear force to the thermosetting adhesive to decrease the durability of the assembled vibrator.

Figure 35:
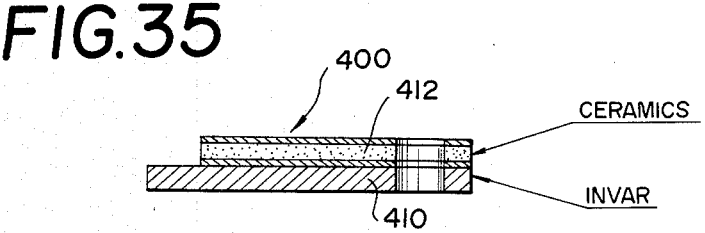
FIG. 35 is an enlarged sectional view of an improved construction according to the present invention.

Therefore, in the preferred construction of the vibrator 400 according to the present invention, the vibrator comprises an invar plate 410 having a thermal expansion coefficient of $1.2 \times 10^{-6}/°C$. and a ceramic material 412 as the piezoelectric vibration element having a thermal expansion coefficient of $1.5 \times 10^{-6}/°C$. The invar plate 410 and the ceramic element 412 are bonded together to form the vibrator 400 by the thermosetting adhesive, as shown in FIG. 35. In the preferred embodiment, the invar for forming the invar plate 410 is a compound including 64% iron and 36% nickel to provide a smaller thermal expansion coefficient than brass.

In construction, a high-nickel steel such as invar is rather difficult to bond. The adhesive strength of the invar is considerably smaller than that of brass. Therefore, the invar plate is preferably processed to increase the adhesive strength by forming a phosphate membrane on the surface thereof. The process for increasing the adhesive strength of the invar can be performed by partially etching by a chemical method using hydrochloric acid or hydrogen fluoride or by wearing by sandblasting to form an unevenness on the surface.

Generally, the amount of bending of the vibrator secured in the cantilever fashion can be calculated from the following equation:

$$DH = (h \times DT \times L^2)/t$$

where
DH: amount of bending
h: difference of thermal expansion coefficient
DT: variation of temperature
L: length of the tongue portion
t: thickness of the vibrator Here, assuming $DT = 120°$ C., $h = 17.5 \times 10^{-6}$, $L = 7$ mm and $t = 0.2$ mm, $DH = 0.51$ mm in the case of the vibrator comprising the brass plate having the thermal expansion coefficient of $19 \times 10^{-6}/°C$. and the piezoelectric element having the thermal expansion coefficient of $1.5 \times 10^{-6}/°C$., while $DH = 0.015$ mm in the case of the vibrator comprising the invar plate having the thermal expansion coefficient of $1.2 \times 10^{-6}/°C$. and the piezoelectric element $1.5 \times 10^{-6}/°C$. As seen from the foregoing, according to the preferred embodiment of the present invention, the amount of bending of the vibrator can be reduced to 1/34 of the conventional vibrator which uses the brass plate.

If necessary, by increasing of the ratio of nickel in the compound, i.e. invar, the thermal expansion coefficient of the invar will approach that of the piezoelectric element.

Figure 40:
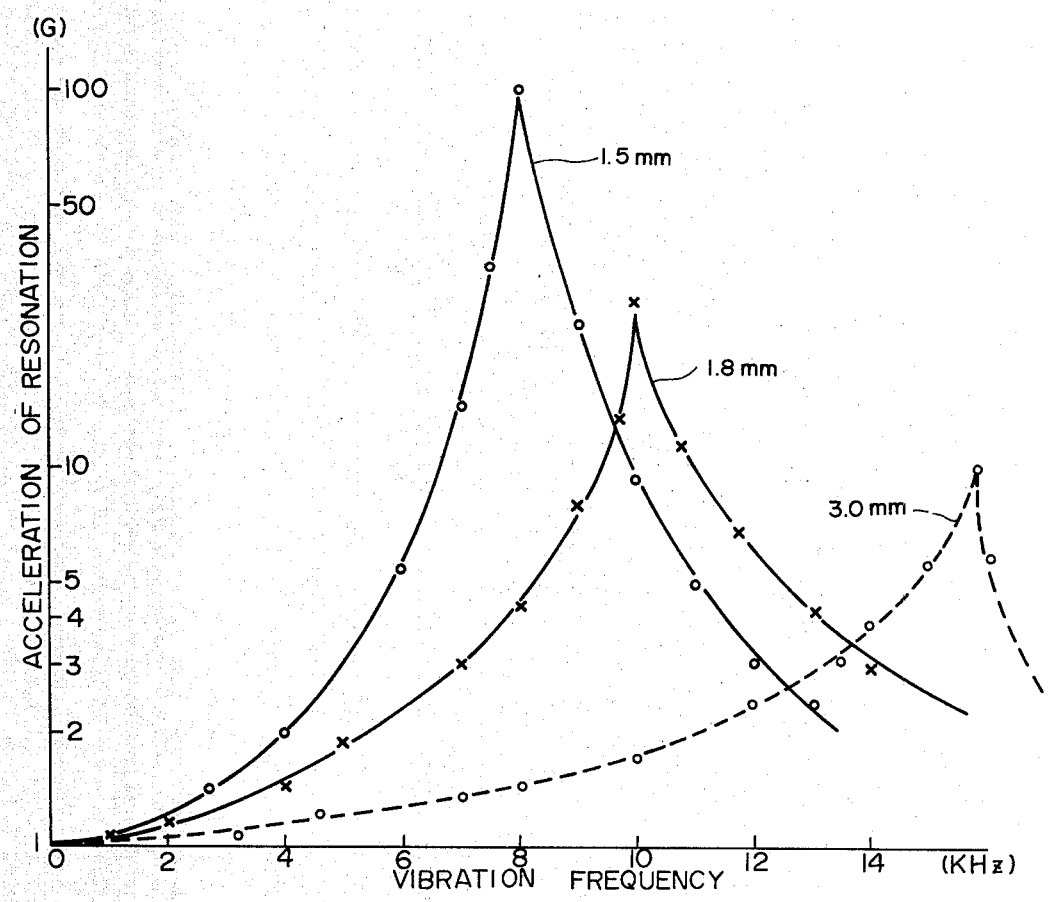
FIG. 40 is a graph showing the relationship between the thickness of the sensor cover and the resonating point thereof.

FIG. 40 shows the vibration characteristics corresponding to the various thicknesses of the sensor cover 504 of the embodiment shown in FIG. 36. For showing the variation in resonating point and acceleration of resonation of various thickness of sensor cover, there are shown examples of 1.5 mm, 1.8 mm and 3.0 mm thick sensor covers 504. As shown in FIG. 40, the resonating point decreases with a corresponding reduction of sensor cover thickness.

Figure 41:
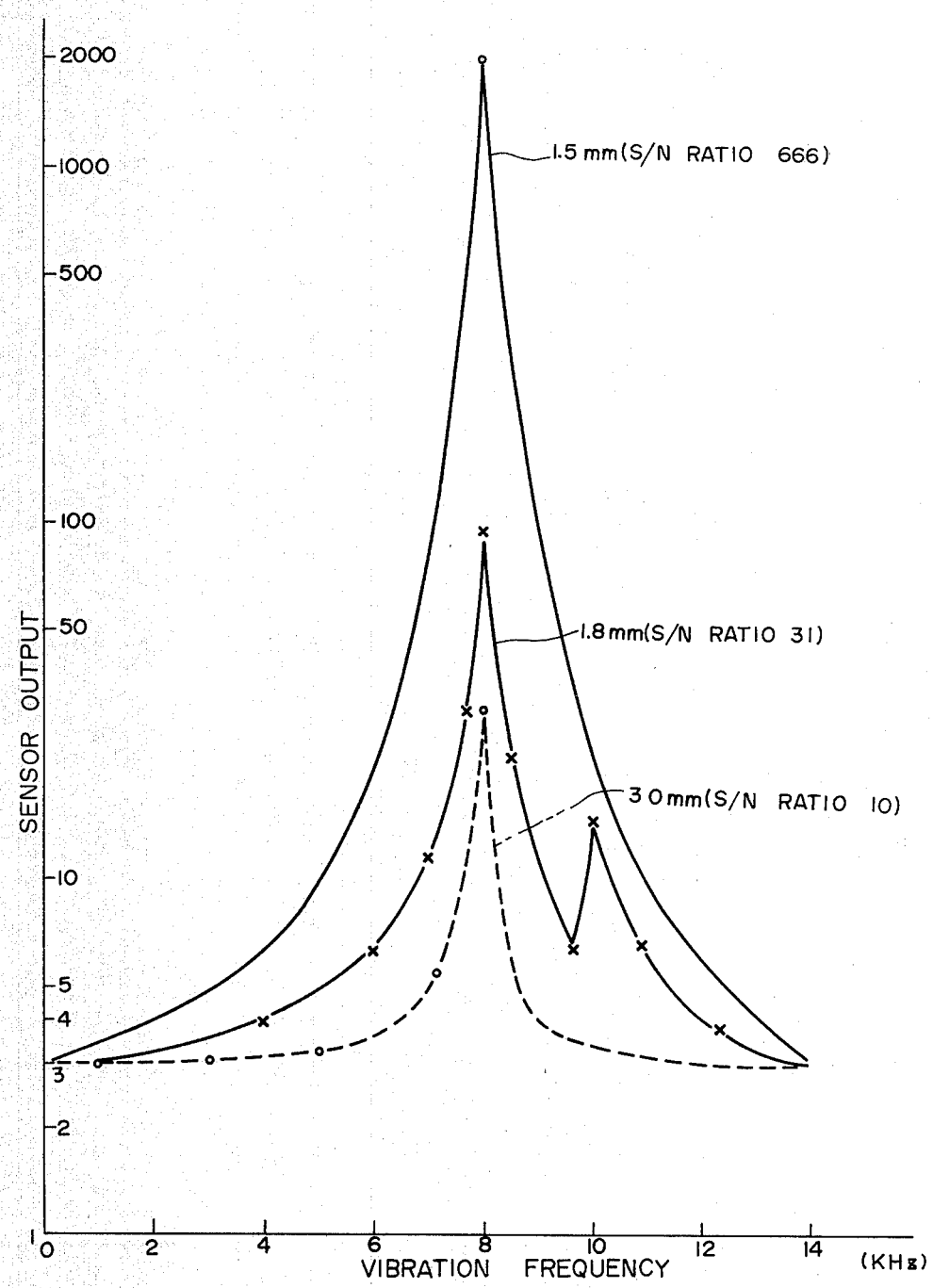
FIG. 41 is a graph showing the relationship of the magnitude of vibration applied to the vibrator and the sensor output.

FIG. 41 is a graph showing the relationship between the magnitude of vibration of the vibrator and the sensor output generated by the piezoelectric element in response to the vibration for various thicknesses of sensor cover 504. Regarding the 1.5 mm thick sensor cover, since the resonating frequency of the vibrator and the sensor cover are matched together at 8 KHz, the magnitude of vibration around the vibration frequency 8 KHz considerably increases and thereby the signal-to-noise ratio increases correspondingly to 666.

Regarding the 1.8 mm thick sensor cover, since the resonating point of the sensor cover is at 10 KHz, two sensor output peaks appear in the graph. However, in spite of the difference of resonating frequency, the signal-to-noise ratio increases only to 31.

Regarding the 3.0 mm thick sensor cover in which the resonating frequency of the sensor cover is 16 KHz, the resonating point of the sensor cover is considerably different from the resonating point of the vibrator. However, the signal-to-noise ratio of the vibrator is still increased to 10.

As seen from the explanation given above, by providing sufficient flexibility to the sensor cover, the magnitude of the resonant vibration applied to the vibrator can be increased, and therefore the signal-to-noise ratio can be improved.

In practice, the resonating point of the vibrator and the cover plate differ slightly to adjust the signal-to-noise ratio of the vibration sensor. For actual use, the signal-to-noise ratio is preferred to be about 21. Of course, as shown in FIG. 41, the signal-to-noise ratio of the vibration sensor will increase as the resonant vibration frequency of the cover plate approaches that of the vibrator and this will result in improved response characteristics of the vibration sensor. However, in considering actual manufacturing processes, it will be difficult to match the resonating points of the vibrator and the cover plate accurately. Therefore, it has been empirically determined that, for optimum results, the resonating point of the cover plate is preferably within a frequency range 10 KHz to 13 KHz.

What is claimed is:

1. A vibration sensor comprising:
a housing having means for attaching said sensor to a vibrating source;
a vibrator including a piezoelectric element having an electrically conductive member on both plane surfaces thereof to form electrodes thereon and a metal plate made from a metal having a thermal expansion ratio approximately the same as that of said piezoelectric element, said piezoelectric element being responsive to vibration applied thereto and generating an electric signal having potential corresponding to the magnitude of sensed vibration; and
a threaded fastener mounting said vibrator to said housing.

2. A sensor as set forth in claim 1, wherein said metal plate is made from invar comprising 64% iron and 36% nickel to provide a thermal expansion ratio of the metal plate of $1.2 \times 10^{-6}/°C$.

3. A sensor as set forth in claim 2, wherein said electrodes are insulated from one another by an insulating member interposed between said vibrator and said threaded fastener, and wherein said insulating member is made from an elastic material.

4. A sensor as set forth in claim 2, wherein said vibrator comprises a substantially disc shaped piezoelectric element and a substantially disc shaped metal plate which has a larger diameter than that of said piezoelectric element.

5. A sensor as set forth in claim 2, wherein said vibrator comprises a fixing portion having a central opening and a substantially rectangular tongue portion, and wherein said fixed portion is secured onto said sensor housing for supporting said tongue portion in cantilever fashion.

6. A sensor as set forth in claim 1, wherein said electrodes are insulated from one another by an insulating member interposed between said vibrator and said threaded fastener.

7. A sensor as set forth in claim 6, wherein said vibrator comprises a substantially disc shaped piezoelectric element and a substantially disc shaped metal plate which has a larger diameter than that of said piezoelectric element.

8. A sensor as set forth in claim 6, wherein said vibrator comprises a fixing portion having a central opening and a substantially rectangular tongue portion, and wherein said fixing portion is secured onto said sensor housing for supporting said tongue portion in cantilever fashion.

9. A sensor as set forth in any one of claims 1 or 2 to 8 inclusive, wherein said sensor housing comprises a sensor body and cover member secured onto said sensor body, said sensor body is formed with a vibrator base protruding toward an internal space formed within said sensor housing and said vibrator is fixedly mounted on said vibrator base in engagement with said threaded fastener and a threaded bore formed in said vibrator base.

10. A sensor as set forth in claim 9, wherein one of said electrodes faces an electrically conductive connecting member to be connected with an output lead therethrough and the other electrode faces said metal plate to be grounded through said metal plate and said sensor body.

11. A sensor as set forth in any one of claims 1 or 2 to 8 inclusive, wherein said sensor housing comprises a sensor body and a cover member secured onto said sensor body, said cover member is formed with a vibrator base protruding toward an internal space formed within said sensor housing and being formed with an opening extending along its central axis, and said threaded fastener is inserted into said internal space through said opening and engages a fastening member for securing said vibrator between said vibrator base and said fastening member.

12. A sensor as set forth in claim 11, wherein said fastening member comprises a retainer and a nut engageble with the thread formed on said threaded fastener, and said threaded fastener is made from electrically conductive material and comprises a thread portion and a head portion to be connected with an output lead.

13. A sensor as set forth in claim 12, wherein said retainer is of substantially the same shape as that of said fixing portion of said vibrator.

14. A sensor as set forth in claim 13, wherein said fixing portion of said vibrator, said retainer and said vibrator base are formed with a substantially square opening, and an insulating member having a square outer periphery and a sectionally circular opening, said square openings and square outer periphery of said insulating member acting as positioning means for determining the direction of said tongue portion of said vibrator.

15. A sensor as set forth in claim 13, wherein said fixing portion of said vibrator, said retainer and said vibrator base are formed with small openings substantially parallel to central openings thereof, and a pin acting as said positioning means is received in and engages with said small openings to position said vibrator base, retainer and vibrator in a predetermined direction in alignment with said small openings.

16. A sensor as set forth in claim 13, wherein said retainer comprises upper and lower members which hold said fixing portion of said vibrator therebetween, said retainer is of substantially square shaped configuration to act as positioning means.

17. A sensor as set forth in claim 13, wherein said retainer is made of synthetic resin and molded to surround said fixing portion of said vibrator, said molded retainer is formed with openings on both planar surfaces thereof, through which said electrodes are connected respectively to said sensor body and said outputting member for outputting sensor output.

18. A sensor as set forth in claim 11, wherein said fixing portion of said vibrator, said retainer and said vibrator base are formed with a substantially square opening and an insulating member of square outer periphery is formed with a sectionally circular opening, said square openings and square outer periphery of said insulating member acting as positioning means for determining the direction of said tongue portion of said vibrator.

19. A sensor as set forth in claim 11, wherein said fixing portion of said vibrator, said retainer and said vibrator base are formed with small openings substantially parallel to central openings thereof, a pin acting as said positioning means is received in and engages in said small openings to position said vibrator base, retainer and vibration in a predetermined direction in alignment with said small openings.

20. A sensor as set forth in claim 11, wherein said retainer comprises upper and lower members which hold said fixing portion of said vibrator therebetween, said retainer is of substantially square shaped configuration to act as positioning means.

21. A sensor as set forth in claim 11, wherein said retainer is made from synthetic resin and molded to surround said fixing portion of said vibrator, said molded retainer is formed with openings on both planar surfaces thereof, through which said electrodes are connected respectively to said sensor body and said outputting member for outputting sensor output.

22. A sensor as set forth in claim 21, said vibrator has a resonating point which corresponds to a specific vibration frequency.

23. A sensor as set forth in claim 22, wherein said specific vibration frequency is an engine vibration frequency in engine knocking condition.

24. A sensor as set forth in claim 23, wherein said cover member vibrates in response to an engine vibration frequency applied thereto and has a resonating point approximate to said resonating point of said vibrator for amplifying vibration applied to said vibrator in order to increase the signal-to-noise ratio of said sensor.

25. A sensor as set forth in claim 24, wherein said signal-to-noise ratio is approximately 21.

26. A sensor as set forth in claim 24, wherein said resonating point of said vibrator is set at about 8 KHz and resonating point of said cover member is in a range of 10 KHz to 13 KHz, whereby signal-to-noise ratio of said sensor output is about 21.

27. A sensor as set forth in claim 22, wherein said cover member vibrates in response to the specific frequency of vibration applied thereto and has a resonating point approximate to said resonating point of said vibrator for amplifying vibration applied to said vibrator in order to increase the signal-to-noise ratio of said sensor.

28. A sensor as set forth in claim 1, wherein said vibrator comprises a substantially disc shaped piezoelectric element and substantially disc shaped metal plate which has a larger diameter than that of said piezoelectric element.

29. A sensor as set forth in claim 1, wherein said vibrator comprises a fixing portion having a central opening and substantially rectangular tongue portion, and wherein said fixing portion is secured onto said sensor housing for supporting said tongue portion in cantilever fashion.

30. A sensor as set forth in claim 29, further having positioning means for determining the direction of said vibrator and said tongue portion.

31. A sensor as set forth in claim 30, wherein said positioning means is provided on said insulating member.

32. A sensor as set forth in claim 1, wherein said sensor housing comprises a sensor body and a cover member secured onto said sensor body, said cover member is formed with a vibrator base protruding toward internal space formed within said sensor housing and being formed with an opening extending along its central axis, said threaded fastener is inserted into said internal space through said opening and engages a fastening member to secure said vibrator between said vibrator base and said fastening member.

33. A knocking sensor for detecting knocking condition of an internal combustion engine comprising:
a sensor housing having an internal space therein and an anchor bolt portion integrally formed therewith, which anchor bolt portion engages a cylinder block of the internal combustion engine;
a vibrator including a piezoelectric element provided with an electrically conductive member on both planar surfaces thereof to form electrodes thereof and a metal plate made from a metal having a thermal expansion ratio approximately the same as that of said piezoelectric element, which piezoelectric element resonates with a specific frequency of engine vibration generated when the engine is driven in knocking condition, said piezoelectric element generating an electric signal having potential corresponding to the magnitude of vibration applied thereto; and
a threaded fastener engaged to said sensor housing within the internal space of the housing.

34. A sensor as set forth in claim 33, wherein said electrodes are insulated from one another by an insulating member interposed between said vibrator and said threaded fastener.

35. A sensor as set forth in claim 34, wherein said sensor housing comprises a sensor body and a cover member secured onto said sensor body, said cover member is formed with a vibrator base protruding toward said internal space of said sensor housing and being formed with an opening extending along its central axis, said threaded faster is inserted into said internal space through said opening and is engaged with a fastening member for securing said vibrator between said vibrator base and said fastening member.

36. A sensor as set forth in claim 35, wherein said fastening member comprises a retainer of electrically conductive material and a nut of electrically conductive material, said threaded fastener comprises a threaded portion and head portion to be connected with an output lead therethrough, whereby one of said electrodes is connected with said output lead through said metal plate, said retainer, said nut and said threaded fastener and the other electrode is grounded through said cover member and said sensor body.

37. A sensor as set forth in claim 35, wherein said vibrator comprises a substantially square fixing portion and a substantially rectangular tongue portion, said fixing portion is secured onto said vibrator base with said tongue portion laterally protruding therefrom said vibrator being supported on said vibrator base in cantilever fashion.

38. A sensor as set forth in claim 37, wherein said vibrator has a resonating frequency at which it resonates in response to engine vibration in engine knocking condition.

39. A sensor as set forth in claim 38, wherein said cover member vibrates in response to a specific frequency of engine vibration together with said vibrator and has a resonating frequency which approximates said resonating frequency of said vibrator for amplifying vibration applied to said vibrator in order to increase signal-to-noise ratio of said sensor output.

40. A sensor as set forth in claim 39, wherein said resonating points of said vibrator and cover member are respectively set at about 8 KHz and about 10 KHz to 13 KHz, whereby signal-to-noise ratio of said sensor output is set at about 21.

41. A sensor as set forth in claim 39, wherein said metal plate is made from invar comprising 64% iron and 36% nickel to provide a thermal expansion ratio to the metal plate of $1.2 \times 10^{-6}/°C$. and said metal plate is bonded to said piezoelectric element having $1.5 \times 10^{-6}/°C$. thermal expansion ratio.

42. A sensor as set forth in claim 33, wherein said metal plate is made from invar comprising 64% iron and 36% nickel to provide a thermal expansion ratio to the metal plate of $1.2 \times 10^{-6}/°C$., and said metal plate is bonded to said piezoelectric element having $1.5 \times 10^{-6}/°C$. thermal expansion ratio.

43. A knocking sensor for detecting an internal combustion engine in knocking condition comprising:
a sensor housing defining an internal chamber therein and having an anchor bolt portion integrally formed therewith and engageable with a cylinder block of the internal combustion engine;
a vibrator including a piezoelectric element having a thermal expansion ratio of about $1.5 \times 10^{-6}/°C$. and a metal plate made from an alloy having a thermal expansion ratio about $1.2 \times 10^{-6}/°C$., which piezoelectric element resonates with a specific frequency of engine vibration generated when the engine is in knocking condition, said piezoelectric element generating an electric signal having a potential corresponding to the magnitude of vibration applied thereto; and
a threaded fastener engaged to said sensor housing so that it mounts said vibrator onto said sensor housing within the internal chamber of the sensor housing.

44. A sensor as set forth in claim 43, wherein said piezoelectric element is provided with an electrically conductive member on both planar surfaces thereof to form electrodes thereon.

45. A sensor as set forth in claim 44, wherein said electrodes are insulated from one another by an insulating member interposed between said vibrator and said threaded fastener.

46. A sensor as set forth in claims 43 or 44, wherein said sensor housing comprises a sensor body and a cover member secured onto said sensor body, said cover member being formed with a vibrator base protruding toward said internal space of said sensor housing and being formed with an opening extending along its central axis, said threaded fastener being inserted into said internal space through said opening and being engaged with a fastening member for securing said vibrator between said vibrator base and said fastening member.

47. A sensor as set forth in claim 46, wherein said fastening member comprises a retainer of electrically conductive material and a nut of electrically conductive material, and said threaded fastener comprises a threaded portion and a head portion adapted to be connected with an output lead therethrough, and wherein one of said electrodes is connected to said output lead through said metal plate, said retainer, said nut and said threaded fastener, and the other electrode is grounded through said cover member and said sensor body.

48. A sensor as set forth in claim 46, wherein said vibrator comprises a substantially square fixing portion and a substantially rectangular tongue portion, said fixing portion being secured onto said vibrator base and having a laterally protruding tongue portion thereon, said vibrator being supported on said vibrator base in cantilever fashion.

49. A sensor as set forth in claim 48, wherein said vibrator has a resonating point at which it resonates at the frequency of the engine vibration in engine knocking condition.

50. A sensor as set forth in claim 49, wherein said cover member and said vibrator vibrate in response to the specific frequency of engine vibration and said cover has a resonating point approximately corresponding to said resonating point of said vibrator for amplifying vibration applied to said vibrator in order to increase signal-to-noise ratio of said sensor output.

51. A sensor as set forth in claim 50, wherein said resonating points of said vibrator and cover member are set at about 8 KHz and about 10 KHz to 13 KHz, respectively, whereby the signal-to-noise ratio of said sensor output is about 21.

52. A sensor as set forth in claim 48, wherein said metal plate is made from invar comprising 64% iron and 36% nickel.

* * * * *

UNITED STATES PATENT AND TRADEMARK OFFICE
CERTIFICATE OF CORRECTION

PATENT NO. : 4,374,472

DATED : February 22, 1983

INVENTOR(S) : Toshifumi Nishimura

It is certified that error appears in the above-identified patent and that said Letters Patent is hereby corrected as shown below:

Column 17, line 23, "electrode" should read -- of said electrodes --.

Column 17, line 48, "claim 39" should read -- claim 37 --.

Signed and Sealed this

Ninth Day of April 1985

[SEAL]

Attest:

DONALD J. QUIGG

Attesting Officer

Acting Commissioner of Patents and Trademarks